US007596068B2

United States Patent
Lee

(10) Patent No.: US 7,596,068 B2
(45) Date of Patent: Sep. 29, 2009

(54) APPARATUS AND METHOD FOR DETERMINING TYPE OF OPTICAL DISK

(75) Inventor: Jong Hyeok Lee, Pyungtaek-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 770 days.

(21) Appl. No.: 10/769,813

(22) Filed: Feb. 3, 2004

(65) Prior Publication Data

US 2004/0213099 A1    Oct. 28, 2004

(30) Foreign Application Priority Data

Feb. 4, 2003    (KR) ...................... 10-2003-0006937

(51) Int. Cl.
*G11B 5/58*    (2006.01)
(52) U.S. Cl. ................. 369/53.23; 369/53.37
(58) Field of Classification Search ............. 369/53.23, 369/53.22, 53.37
See application file for complete search history.

(56) References Cited

U.S. PATENT DOCUMENTS

| 5,745,461 | A * | 4/1998 | Kawasaki | 369/53.23 |
| 5,917,791 | A * | 6/1999 | Tsuchiya et al. | 369/53.23 |
| 6,560,170 | B2 * | 5/2003 | Hirose | 369/30.04 |
| 6,594,210 | B2 * | 7/2003 | Kumagai | 369/47.17 |
| 6,747,931 | B1 * | 6/2004 | Park | 369/53.23 |
| 6,859,425 | B2 * | 2/2005 | Maegawa et al. | 369/47.3 |
| 6,879,555 | B2 * | 4/2005 | Takeuchi | 369/53.23 |
| 2001/0043515 | A1 * | 11/2001 | Ueki | 369/30.1 |
| 2004/0130991 | A1 * | 7/2004 | Tawaragi | 369/53.22 |
| 2004/0218497 | A1 * | 11/2004 | Choi et al. | 369/53.23 |

FOREIGN PATENT DOCUMENTS

| CN | 1189666 A | 8/1998 |
| CN | 1268736 A | 10/2000 |
| KR | 2001-0072820 A | 7/2001 |
| KR | 2002-0079318 | 10/2002 |

* cited by examiner

*Primary Examiner*—Tan X Dinh
(74) *Attorney, Agent, or Firm*—Birch, Stewart, Kolasch & Birch, LLP

(57) ABSTRACT

Disclosed is an apparatus and method for determining the type of an optical disk so as to implement an optimal servo operation according to the type of a loaded optical disk. In the method, the level of a wobble extraction signal is detected while a focusing servo is turned on, and the type of the loaded optical disk is determined based on the detected signal level, and then a tracking servo adjustment operation is performed according to the determined optical disk type. Accordingly, optical disk reproduction and/or recording characteristics are improved by performing an optimal tracking servo adjustment operation according to the determined optical disk type. Further, if the type of the loaded optical disk is read-only, there is no time loss, thus allowing a swift reproduction operation, since unnecessary operations such as recording mode adjustment and gain adjustment of a digital recording signal processor are omitted.

15 Claims, 4 Drawing Sheets

APPARATUS AND METHOD FOR DETERMINING TYPE OF OPTICAL DISK

This Nonprovisional application claims priority under 35 U.S.C. § 119(a) on Patent Application No(s). 03-6937 filed in KOREA on Feb. 4, 2003, the entire contents of which are hereby incorporated by reference.

BACKGROUND OF THE INVENTION

1. Field of the Invention

The present invention relates to an apparatus and method for determining the type of an optical disk in order to implement an optimal servo operation according to the type of a loaded optical disk.

2. Description of the Related Art

FIG. 1 is a flowchart showing an example of a method for determining the type of an optical disc employed in a conventional optical disk device. The conventional method for determining the type of an optical disk will now be described with reference to FIG. 1.

In the prior art, when an optical disk is loaded, it is determined, from an FG signal detected as a spindle motor rotates, whether the optical disk is loaded and whether the loaded disk is 8 or 12 cm in size, and it is also determined whether it is a CD-RW (S1). This determination may be based on the reflectivity of the optical disk, i.e., the level of a focusing error signal detected when an objective lens is moving in a direction perpendicular to the disk surface while an internal laser diode LD in an optical pickup is turned on.

After such disk discrimination has been performed, the optical disk device turns a focusing servo on after adjusting the focusing gain and the offset of an R/F IC according to the disk discrimination result (S2). Then, the optical disk device turns a tracking servo on after adjusting the tracking gain (S3).

Next, the optical disk device shifts to a recording mode and performs a corresponding adjustment operation, and also performs an automatic focusing/tracking gain adjustment operation of both a digital recording signal processor and a digital reproduction signal processor, and a gain adjustment operation of the R/F unit (S4 and S5).

If it is determined that the loaded optical disk is not a CD-RW (S6), the optical disk device turns a wobble servo on for reading ATIP (Absolute Time In Pre-groove) signals after the focusing and tracking gain adjustment operation and the recording mode adjustment operation have been performed, and checks whether an ATIP signal is detected within a predetermined time, so as to determine whether the optical disk is a CD-R or CD-ROM (S7). If an ATIP signal is detected within the predetermined time, the optical disk device determines the optical disk to be a CD-R (S8). On the contrary, if no ATIP signal is detected within the predetermined time, the optical disk device determines the optical disk to be a CD-ROM (S9). When such disk discrimination has been completed, the optical disk device performs a requested operation (S10).

In the prior art, as described above, the determination as to whether the loaded optical disk is a CD-R or CD-ROM is performed after the focusing and tracking servo adjustment has been completed.

However, the conventional optical disk device (for example, a CD-RW drive) generally employs the same tracking servo scheme, i.e., a push-pull tracking servo scheme having a high optical efficiency, irrespective of the type of a loaded optical disk, although it is required to employ an optimal tracking servo scheme according to the type of the optical disk in order to improve the reproduction characteristics. The conventional device thus has a problem in that the reproduction and/or recording characteristics are degraded for CD-R and CD-ROM disks.

In addition, the conventional device performs the recording mode adjustment operation and the automatic focusing/tracking gain adjustment operation of the digital recording signal processor, as described above, before determining whether the optical disk is a CD-R or CD-ROM. For this reason, if the loaded optical disk is a CD-ROM, i.e., a read-only disk, the reproduction operation is delayed since the unnecessary adjustment operation is performed.

SUMMARY OF THE INVENTION

Therefore, the present invention has been made in view of the above problems, and it is an object of the present invention to provide an apparatus and method for determining the type of an optical disk, wherein optical disk reproduction and/or recording characteristics are improved by performing an optimal tracking servo adjustment operation according to the type of a loaded optical disk, and in the case where the type of the loaded optical disk is read-only, there is no time loss such as reproduction delay by omitting an unnecessary operation such as a recording mode adjustment.

In accordance with one aspect of the present invention, the above and other objects can be accomplished by the provision of a method for determining the type of an optical disk, comprising the steps of: a) detecting a level of a wobble extraction signal while a focusing servo is turned on; b) determining a type of a loaded optical disk based on the detected signal level; and c) performing a tracking servo adjustment operation according to the determined optical disk type.

The detected level of the wobble extraction signal is detected while a tracking servo is turned off.

In accordance with another aspect of the present invention, there is provided an apparatus for determining the type of an optical disk, comprising: a servo means for performing a focusing and tracking servo adjustment operation on an optical pickup means; a level detection means for detecting a level of a wobble extraction signal produced from a signal detected by the optical pickup means while a focusing servo in the servo means is turned on; and a control means for determining the type of the optical disk based on the detected level, and controlling the servo means to perform a tracking servo adjustment operation according to the determined result.

The level detection means detects the level of the wobble extraction signal while the tracking servo is turned off.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFFERRED EMBODIMENTS

An apparatus and method for determining the type of an optical disk according to preferred embodiments of the present invention will now be described in detail with reference to the annexed drawings.

Figure 1:
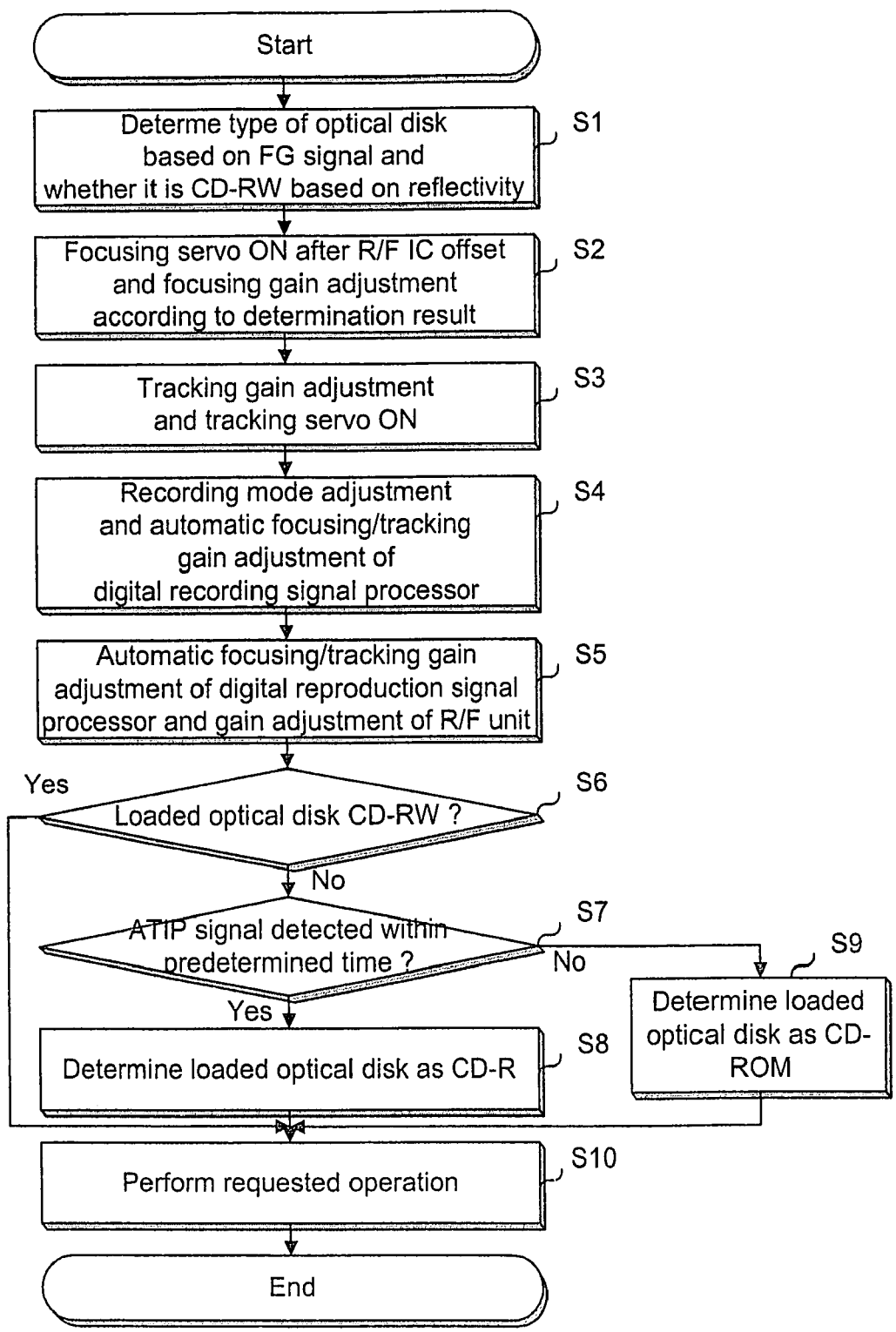
FIG. 1 is a flowchart showing an example of a method for determining the type of an optical disc employed in a conventional optical disk device.
Figure 2:
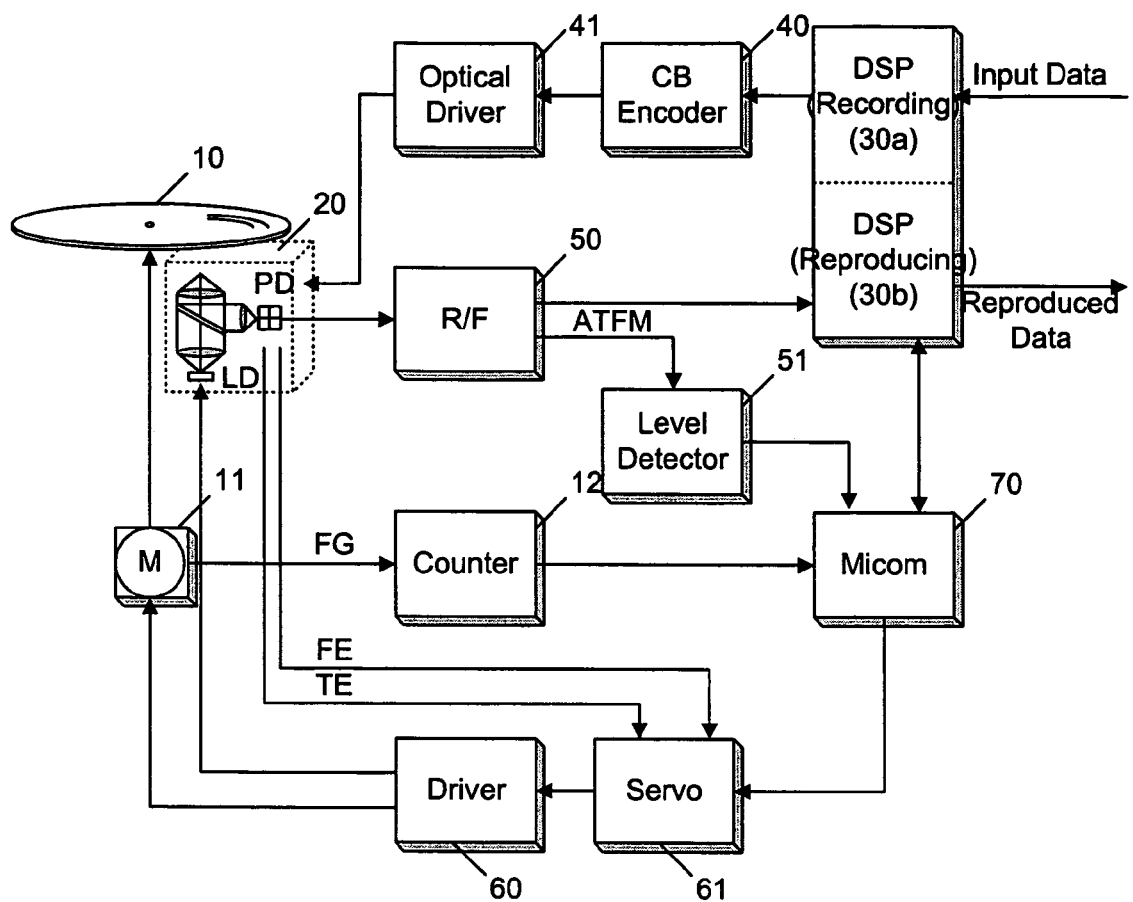
FIG. 2 is a block diagram showing the configuration of an optical disk device in which an apparatus for determining the type of an optical disk according to the present invention is embodied.

FIG. 2 is a block diagram showing the configuration of a preferred embodiment of an optical disk device in which an apparatus for determining the type of an optical disk according to the present invention is embodied.

As shown in this figure, the optical disk device includes a channel bit encoder 40, an optical drive 41 and a digital recording signal processor 30a for recording data.

In addition, the optical disk device includes a counter 12, an optical pickup 20, an R/F unit 50, an ATFM signal level detector 51, a spindle motor 11 for rotating an optical disk 10, a drive unit 60 for driving an optical pickup 20, a servo unit 61, and a digital reproduction signal processor 30b. The counter 12 counts pulses (FG signals) produced as the spindle motor 11 rotates. The optical pickup 20 records data on the optical disk 10 and reads data from a recording layer thereof according to an inputted optical drive signal. The R/F unit 50 performs filtering and waveform shaping on a signal detected by the optical pickup 20 to output it as a binary signal, and outputs an ATFM signal, as a wobble extraction signal, through an ATFM terminal. The ATFM signal level detector 51 detects the level of the ATFM signal outputted from the R/F unit 50. The servo unit 61 controls the operation of the drive unit 60 based on both a servo error signal (a focusing error signal and a tracking error signal) outputted from the optical pickup 20 and a signal associated with the rotation speed of the optical disk 10. The digital reproduction signal processor 30b recovers original data from the binary signal with a clock synchronized in phase with the binary signal.

The optical disk device further includes a microcomputer 70 that determines the type of a loaded optical disk 10 based on the detected level of the ATFM signal, and controls a focusing and tracking servo operation, a gain adjustment operation, a recording mode adjustment operation, etc., according to the determined result.

Figure 3:
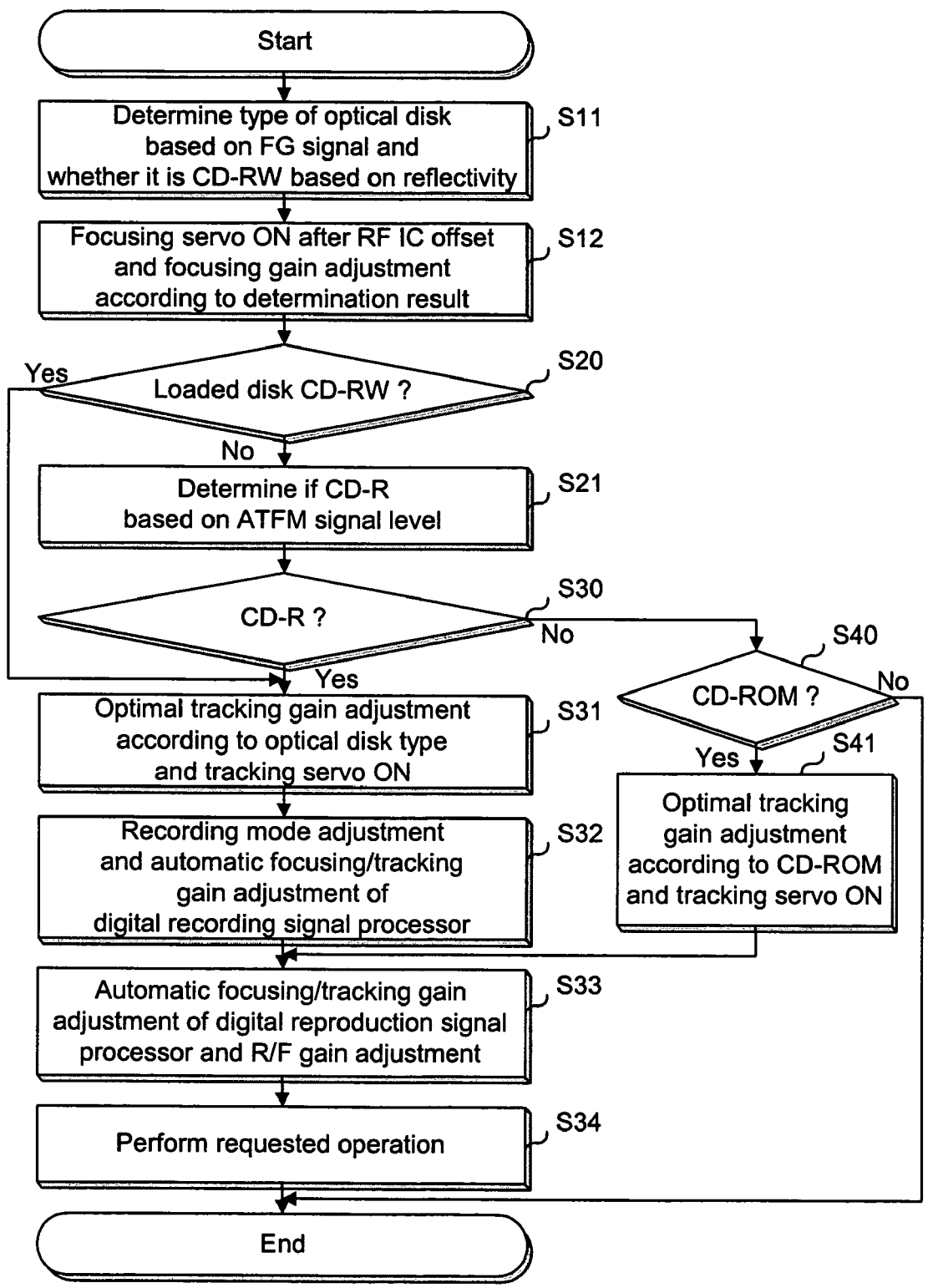
FIG. 3 is a flowchart showing a method for determining the type of an optical disk according to a preferred embodiment of the present invention.

FIG. 3 is a flowchart showing a method for determining the type of an optical disk according to a preferred embodiment of the present invention. This determination method of FIG. 3 will now be described in detail with reference to the device configuration shown in FIG. 2.

If an optical disk 10 is loaded, the microcomputer 70 performs scheduled initial operations such as disk discrimination and servo adjustment.

First, the microcomputer 70 rotates the spindle motor 11 through the servo unit 61 and the drive unit 60. The counter 12 counts pulses (FG signals) outputted from the spindle motor 11, and inputs the count value to the microcomputer 70.

The microcomputer 70 determines whether an optical disk is loaded and whether the loaded optical disk is 8 or 12 cm in size, based on the count value (S11). The reason why this determination is based on the count value is because the count value during one rotation of the optical disk 10 varies depending on both whether the optical disk 10 is loaded and whether the optical disk is 8 or 12 cm in size.

The microcomputer 70 also determines whether the type of the loaded optical disk 10 is CD-RW or not (S11). To this end, the microcomputer 70 detects the reflectivity of the optical disk, i.e., the level of a focusing error signal detected when an objective lens is moving in a direction perpendicular to the disk surface while an internal laser diode LD in the optical pickup 20 is turned on. For example, upon the assumption that the reflectivity of a normal disk is 100%, the microcomputer 70 determines that the optical disk 10 is a CD-RW if the detected reflectivity thereof is 30%.

After such disk discrimination has been performed, the microcomputer 70 optimally adjusts the focusing gain and the offset of the R/F unit 70 on the basis of the discrimination result, as described above, while controlling the position of an objective lens provided in an actuator of the optical pickup 20 to turn on the focusing servo (S12).

While the focusing servo is turned on, the level detector 51 detects the level of an ATFM (Absolute Time Frequency Modulator) signal (wobble extraction signal) outputted through the ATFM terminal of the R/F unit 50.

The ATFM signal is obtained by combining A, B, C and D signals of the optical pickup 20, which is produced to detect a wobble signal of a disk for recording such as a CD-R, and slice it to obtain an ATIP (Absolute Time In Pre-groove) signal. Since the ATFM signal used in the present invention is measured before performing the tracking servo adjustment, it is difficult to correctly produce the ATIP signal as a wobble signal, but since the level thereof can be measured, it is possible to determine whether there is a wobble.

Figure 4:
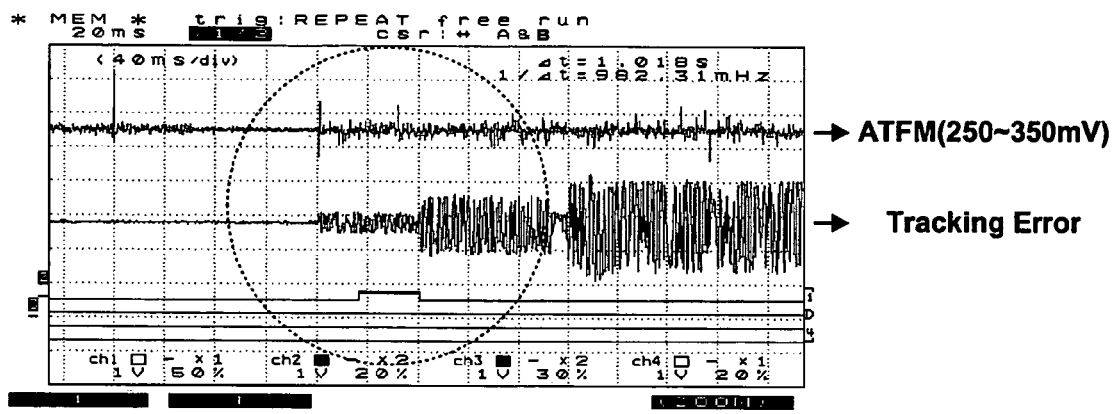
FIGS. 4 and 5 show examples of tracking error signals and ATFM signals according to the type of the optical disk.
Figure 5:
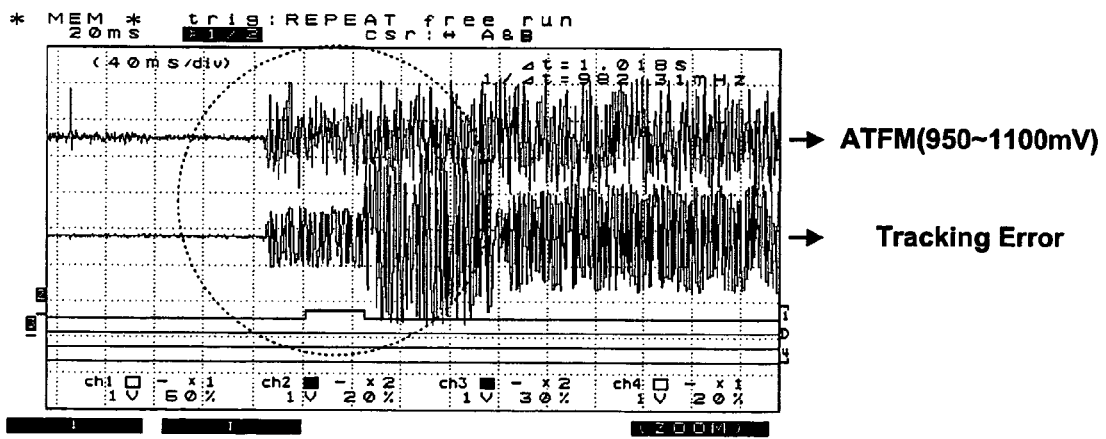

If the determination result at step S11 is that the optical disk 10 is not a CD-RW (S20), the microcomputer 70 determines whether the optical disk is a CD-R or not, based on the detected level of the ATFM signal (S21). If the detected (peak-to-peak) level of the ATFM signal is about 250~350 mV as illustrated in FIG. 4, the microcomputer 70 determines the optical disk 10 to be a CD-ROM. On the other hand, if the detected ATFM signal level is about 950~1100 mV as illustrated in FIG. 5, the microcomputer 70 determines the optical disk 10 to be a CD-R (S30).

If the optical disk 10 is determined to be a CD-RW or CD-R, the microcomputer 70 performs two operations in sequence, the first being an optimal tracking gain adjustment according to the determined type of the optical disk 10 and the second causing the tracking servo to be turned on (S31). After the tracking servo is turned on, the microcomputer 70 shifts to a recording mode and performs a corresponding adjustment operation as described above, and also performs an automatic focusing/tracking gain adjustment operation of both the digital recording signal processor 30a and the digital reproduction signal processor 30b, and a gain adjustment operation of the R/F unit 50 (S32 and S33).

If the optical disk 10 is determined to be a CD-ROM (S40), the microcomputer 70 performs the tacking gain adjustment operation and turns the tracking servo on (S41), and then performs the automatic focusing/tracking gain adjustment operation of the digital reproduction signal processor 30b and the gain adjustment operation of the R/F unit 50 as described above, without shifting to the recording mode and performing a corresponding adjustment operation (S33).

When the optimal servo adjustment and the recording mode adjustment according to the determined type of the optical disk 10 have been completed in such a manner, the microcomputer 70 performs a requested operation (recording or reproduction operation) for the optical disk 10 (S34).

The reason why the present invention determines the type of the optical disk 10 based on the ATFM signal as a wobble extraction signal as in the above embodiment, instead of based on the wobble signal as in the prior art, is because it is impossible to detect the wobble signal as only the focusing servo is currently turned on. In addition, since the ATFM signal level of a CD-R is higher than that of a CD-ROM in which there is no wobble signal, it is possible to easily determine whether the type of a loaded optical disk 10 is CD-R or CD-ROM, based on the ATFM signal level.

Moreover, a 3-beam or DPD tracking servo scheme is suitable for a CD-ROM and a DVD-ROM as a usually printed disk, whereas a DPP tracking servo scheme is suitable for a CD-R/RW and DVD-R/RW. Accordingly, if it is determined whether the type of the disk is R (a disk for recording) or ROM (a printed disk) before the tracking adjustment is performed, the device operation is switched to a tracking servo scheme suitable for the determined disk type, so that it is employed in the corresponding operation. It is thus preferable to select the tracking scheme at step S31 or S41.

As apparent from the above description, an apparatus and method for determining the type of an optical disk according to the present invention has the following advantages. Optical disk reproduction and/or recording characteristics are improved by performing an optimal tracking servo adjustment operation according to the type of a loaded optical disk. In addition, in the case where the type of the loaded optical disk is read-only, there is no time loss, thus allowing a swift reproduction operation, since unnecessary operations such as a recording mode adjustment operation and a gain adjustment operation of a digital recording signal processor are omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for determining the type of an optical disk loaded into an optical disk device, comprising the steps of:
   a) detecting a level of a wobble extraction signal while a focusing servo is turned on but before a focusing servo adjustment has been completed;
   b) determining a type of a loaded optical disk based on the detected signal level; and
   c) performing a tracking servo adjustment operation according to the determined optical disk type.

2. The method according to claim 1, wherein the level of the wobble extraction signal is detected while a tracking servo is turned off.

3. The method according to claim 1, wherein the detected level of the wobble extraction signal for a disk for recording is higher than that of a disk for reproducing.

4. The method according to claim 3, further comprising the step of:
   d) performing an adjustment operation in a recording mode when the determined optical disk type is a recordable disk type.

5. The method according to claim 1, wherein said step c) includes the steps of:
   c-1) selecting a tracking servo scheme according to the determined optical disk type; and
   c-2) adjusting the tracking servo in the selected tracking servo scheme.

6. The method according to claim 5, wherein the selected tracking servo scheme is a 3-beam or DPD scheme for a disk for reproducing, and a DPP scheme for a disk for recording.

7. An apparatus for determining the type of an optical disk loaded into an optical disk device, comprising:
   a servo means for performing a focusing and tracking servo adjustment operation on an optical pickup means;
   a level detection means for detecting a level of a wobble extraction signal produced from a signal detected by the optical pickup means while a focusing servo in the servo means is turned on but before a focusing servo adjustment has been completed; and
   a control means for determining the type of the optical disk based on the detected level, and controlling the servo means to perform a tracking servo adjustment operation according to the determined result.

8. The apparatus according to claim 7, wherein the level detection means detects the level of the wobble extraction signal while the tracking servo is turned off.

9. The apparatus according to claim 7, wherein the control means performs an adjustment operation in a recording mode when the determined optical disk type is a recordable disk type.

10. The apparatus according to claim 7, wherein the control means selects a tracking servo scheme according to the determined optical disk type.

11. The apparatus according to claim 10, wherein the selected tracking servo scheme is a 3-beam or DPD scheme for a disk for reproducing, and a DPP scheme for a disk for recording.

12. A method for determining the type of an optical disk that is loaded into an optical disk device, comprising:
   loading the optical disk into the optical disk device;
   determining initially a type of the loaded optical disk;
   activating a focusing servo based on the initial determination result;
   detecting a level of a wobble extraction signal while the focusing servo is activated and a tracking servo is turned off;
   determining finally the type of the loaded optical disk based on the detected wobble extraction signal level; and
   performing a tracking servo adjustment operation according to the finally determined type of the loaded optical disk.

13. An apparatus for determining the type of an optical disk loaded into an optical disk device, comprising:
   means for loading the optical disk into the optical disk device;
   means for determining initially a type of the loaded optical disk;
   means for activating a focusing servo based on the initial determination;
   means for detecting a level of a wobble extraction signal while the focusing servo is activated and a tracking servo is turned off;
   means for determining finally the type of the loaded optical disk based on the detected wobble extraction signal level; and
   means for performing a tracking servo adjustment operation according to the finally determined type of the optical disk.

14. The method according to claim 1, wherein the wobble extraction signal is an absolute time frequency modulation (ATFM) signal.

15. The apparatus according to claim 7, wherein the wobble extraction signal is an absolute time frequency modulation (ATFM) signal.

* * * * *